Figure 3B:
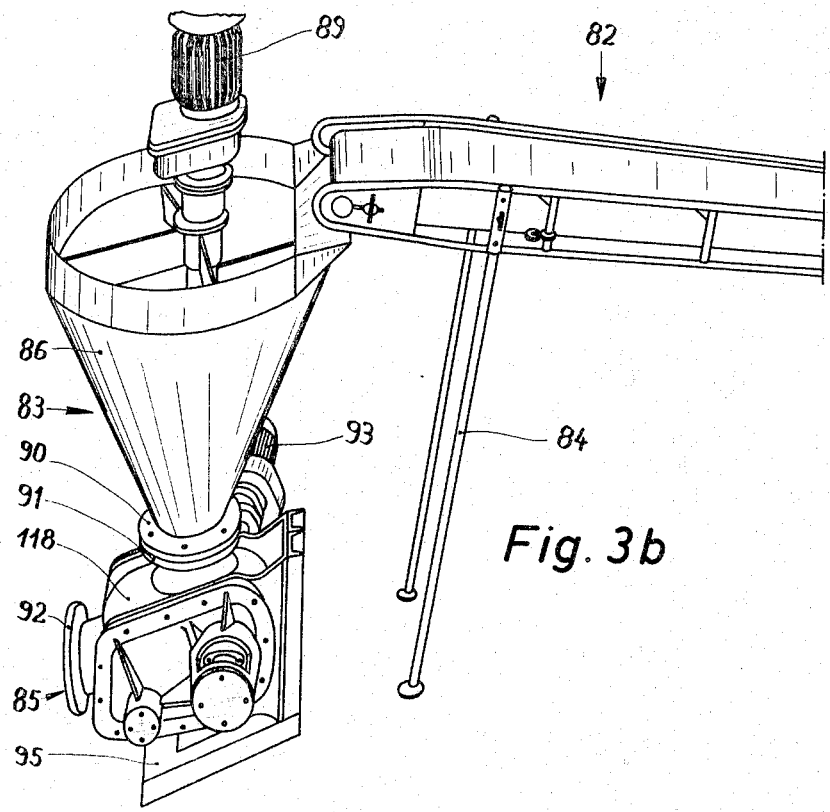

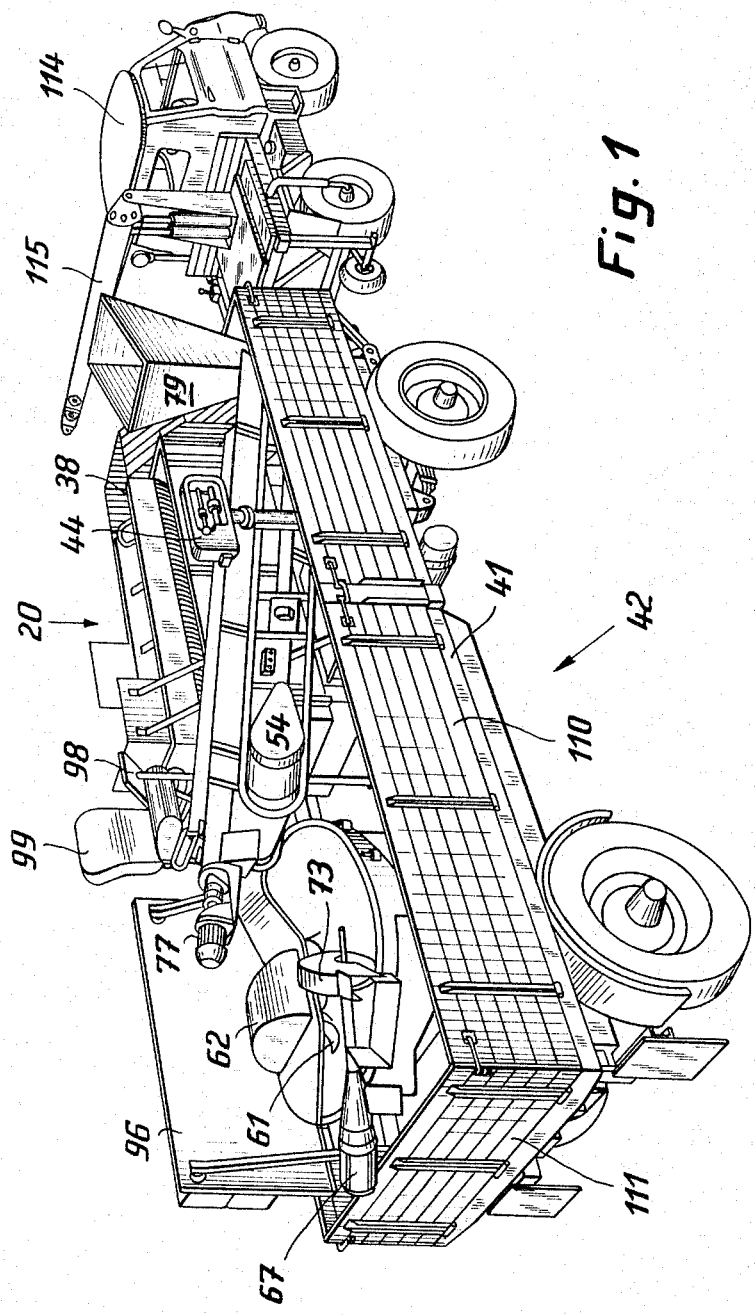

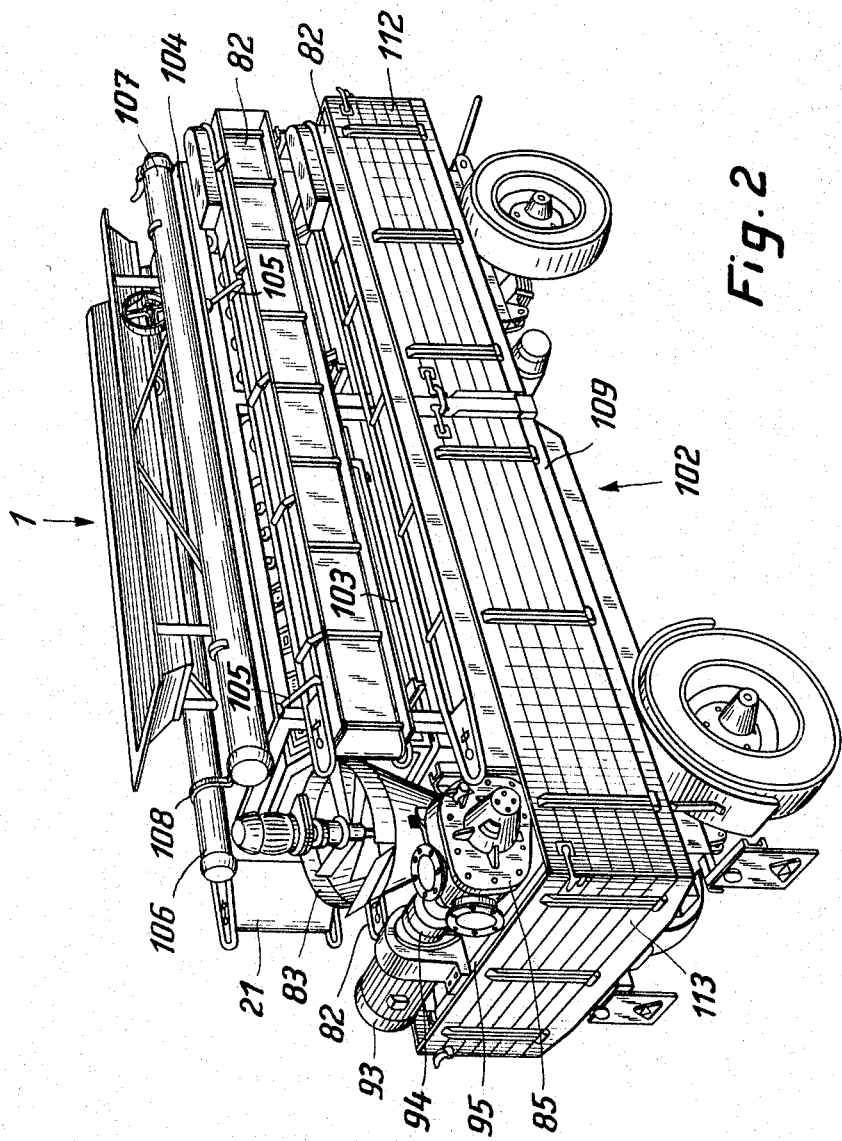

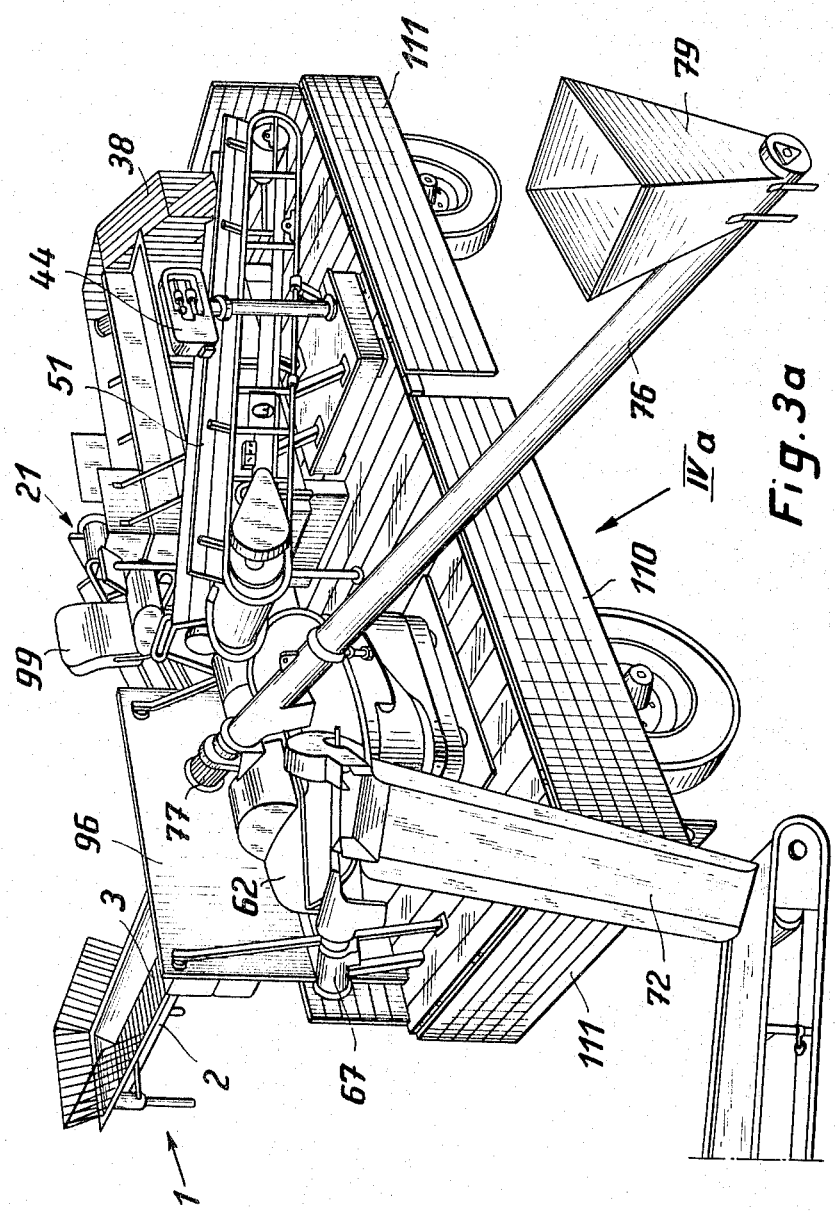

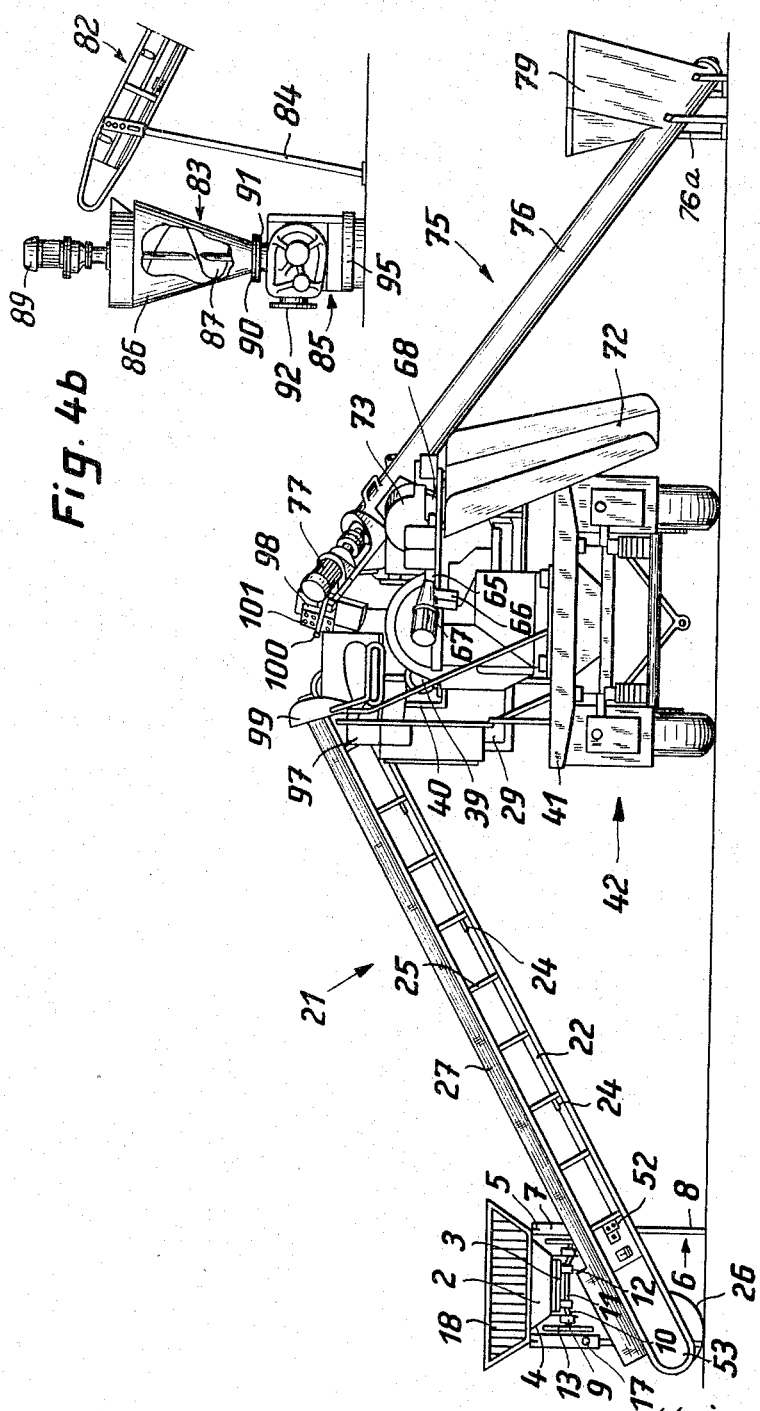

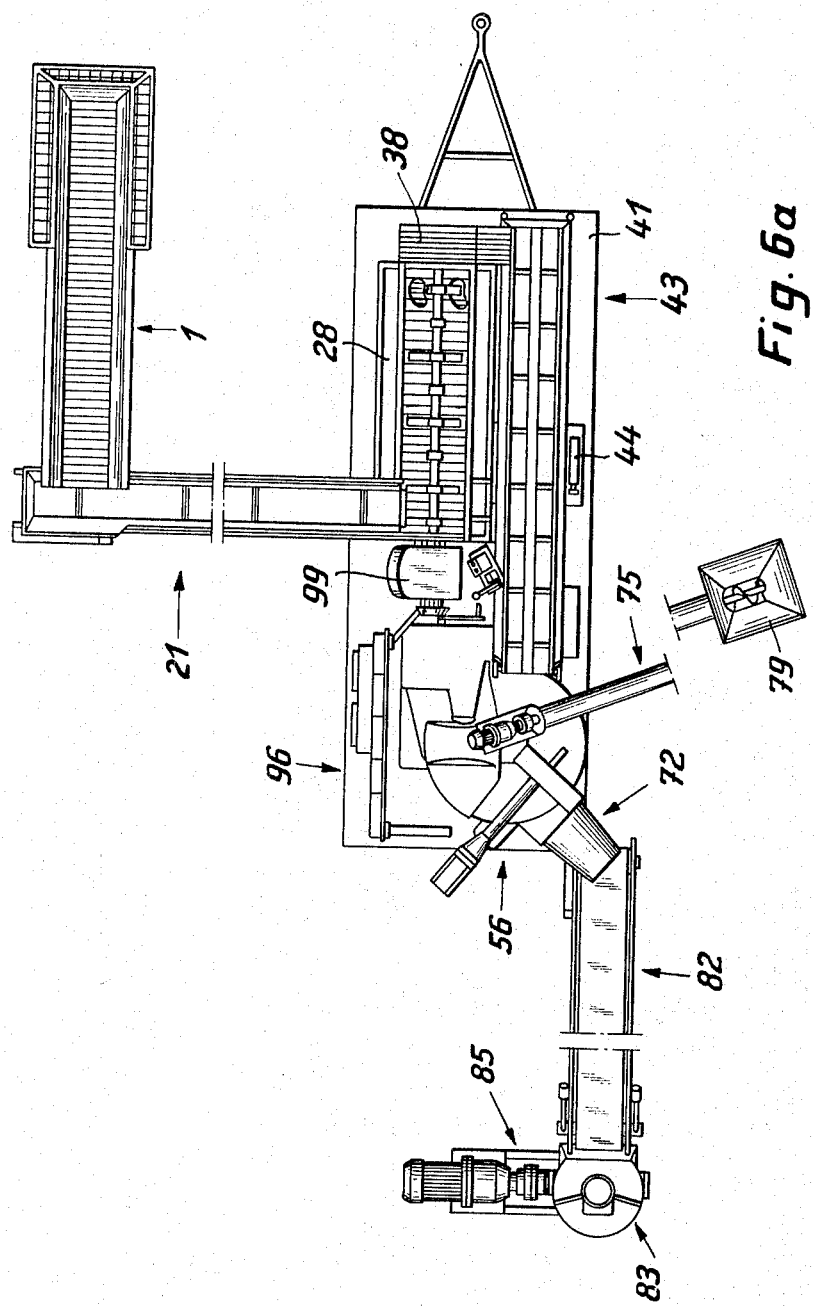

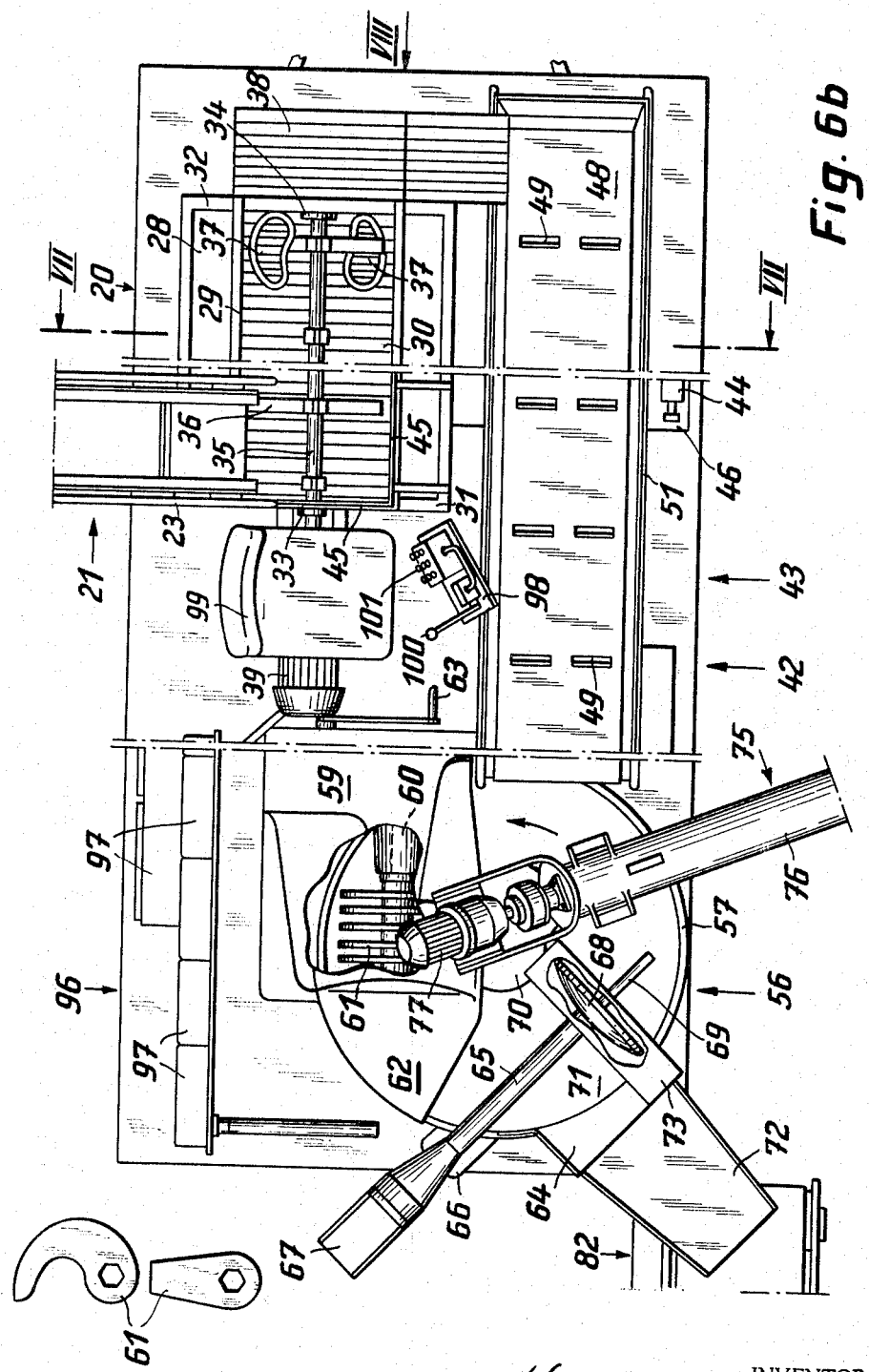

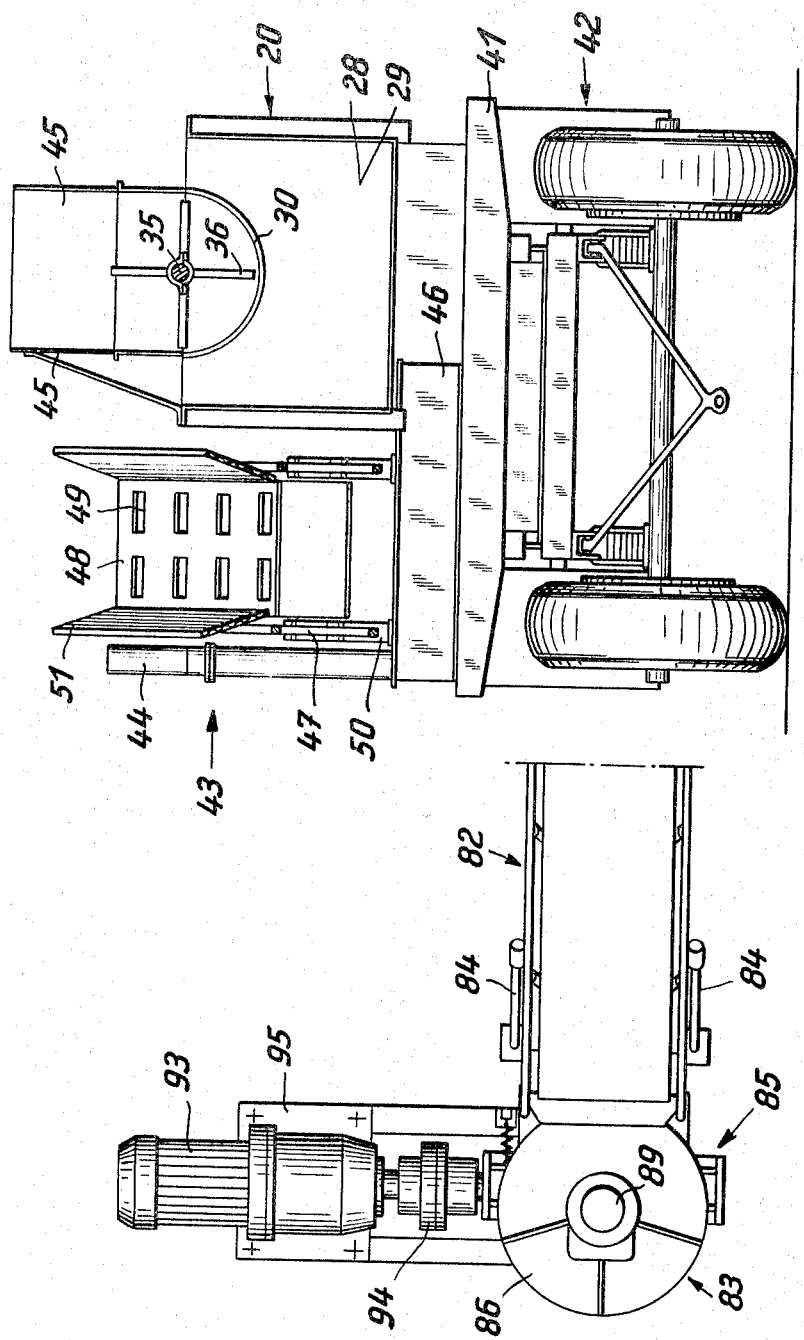

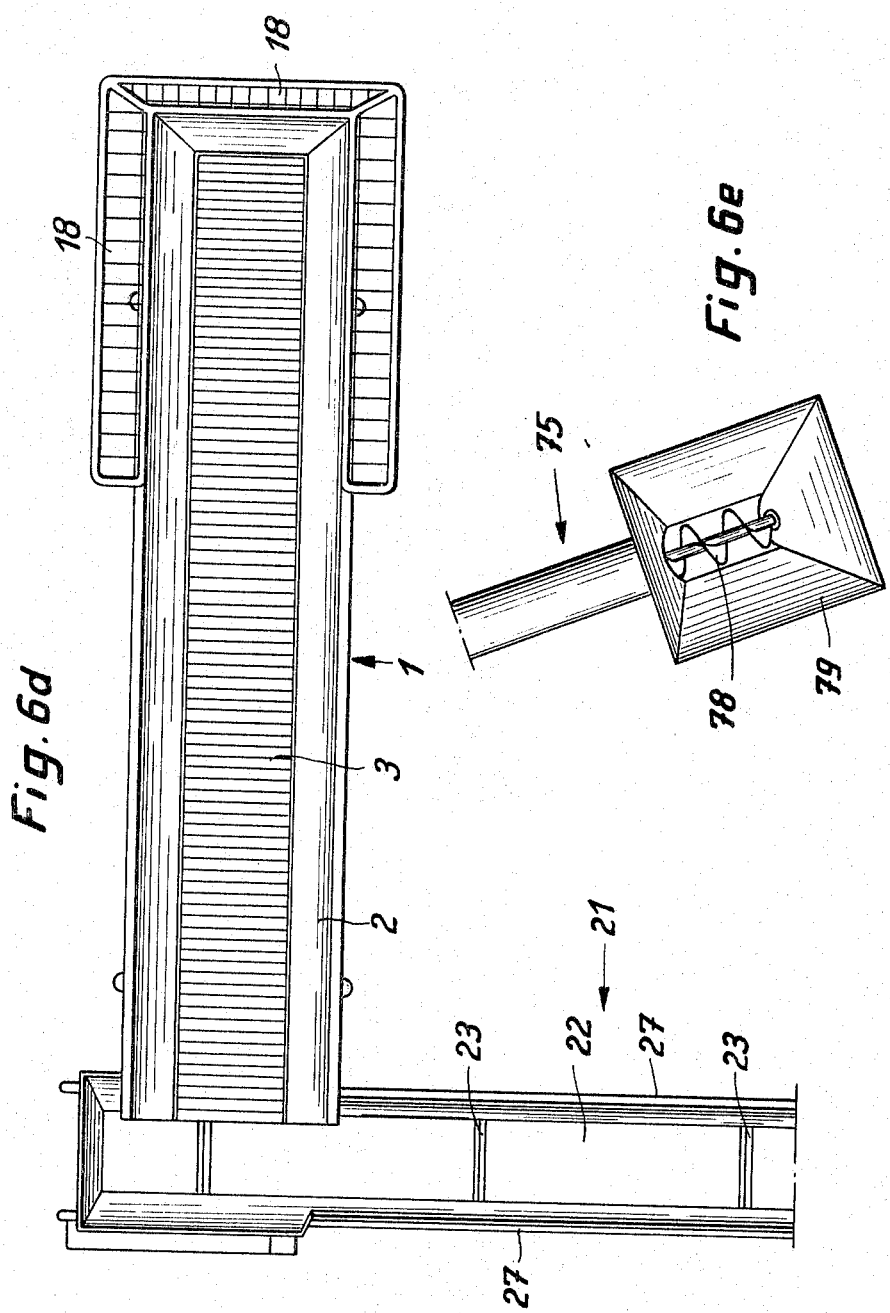

United States Patent Office 3,316,830
Patented May 2, 1967

3,316,830
APPARATUS FOR THE PREPARATION OF A FODDER MIXTURE FOR SUBSEQUENT ENSILAGE
Heinrich Biehl, Heinrichshof, near Trittau, Germany
Filed Oct. 13, 1965, Ser. No. 495,602
Claims priority, application Germany, Oct. 13, 1962,
B 69,218
8 Claims. (Cl. 99—235)

This application is a continuation-in-part of my copending application U.S. Ser. No. 295,900, filed July 18, 1963, now abandoned.

The invention relates to an apparatus for the preparation of fodder mixture for subsequent ensilage.

In the U.S. Patent 3,172,764 a process for the production of a fermented fodder has been proposed in which the fresh fodder, dry starch-containing substances, dry albumen-containing substances and, inasmuch as the fresh fodder contains less than about 2% of sugar, sugar-containing substances are comingled to form a mixture which is then ensilaged. The present patent application contains the teaching that, if the following conditions are fulfilled, an especially valuable ensilaged fodder may be provided which animals like to eat, with extremely small losses of nourishing substances occurring and the fodder being favourably used up from a physiological and nourishing standpoint.

(1) The water content must be restricted to about 50–75% as opposed to 78–90% with fresh substances rich in juice;

(2) The sugar content of the ensilaged fodder must at least be 1–2%;

(3) The albumen-starch ratio should preferably correspond to that of cereals which is 1:4 to 1:10, preferably 1:6.

With such composition of the fresh fodder and the additives, formation of lactic acid during fermentation is much favored over the formation of acetic acid and butyric acid.

The adjacent of the water content of 50–75% as required under point 1 above is obtained by the addition of dry, predominantly starch-containing substances such as grist of cereals or tapioca meal; in this way, the total juice is kept in the fermented fodder.

The sugar content provided for under 2 above which is at least 1–4%, is obtained by the addition of sugar directly or dates of sugar containing fruits in accordance with their sugar content or by the addition of sugar-containing turnip chips.

The albumen-starch ratio mentioned under 3 above which is 1:4 to 1:10, preferably 1:6, is obtained by the addition of vegetable or animal albumen substance such as soy beans, extraction grist, fish meal, powdered meat, or similar products made of fish and meat wastes. By the addition of vitamins, trace elements and other auxiliary substances, the composition of the mixture to be ensiled may obtain such a character that the silage fodder made thereof is suited to be used as a sole fodder (formula).

The influence on the fermentation in favor of the formation of lactic acid as mentioned above is effected on the one hand by the addition of sugar as provided for and, furthermore, through an adjustment of a favorable water content and anaerobic ensilaging conditions as usual. Finally, in this connection minor amounts of antibiotics (up to 50 grams per ton) may be added.

The green or fresh fodder types of this ensilaged fodder espectially include grass, fresh turnips, fresh turnip leaves, and fresh potatoes but also other field products, for instance, lucernes It has been found that the cost of machinery for the production of this ensilaged fodder mixture is extraordinarily high. It must furthermore be taken into consideration that the farmer has still to face the costs for the erection of the silo container or a plurality of silo containers if he intends to avail himself of the advantages brought about by the production and feeding of such ensilaged fodder mixture which are considerable in themselves. The costs of the machines are so substantial that farmers running small and medium sized farms must very likely refrain from introducing this type of fodder preparation simply because the investment costs involved with the erection of the machinery cannot be incurred.

What adds to the difficulties is the fact that both the comminuting machine and the mixing machine have very high power requirements. If a machine is electrically driven, the electrical capacity of a small or medium sized farm will often not suffice so that this farm will be compelled to provide for auxiliary drives such as internal combustion engines which causes additional costs to the erection and the running of the plant.

The invention relates thus to a device for the preparation of the fodder mixture consisting at least of one comminuted green or fresh fodder, or dry starch carrier and an albumen carrier for subsequent ensilage. It is the principal problem of the present invention to provide an apparatus which enables also small and medium sized farms to procure such ensilaged fodder mixtures with minor and, at any rate, economically tolerable costs, the invention, however, now being restricted to the use of the apparatus on small and medium sized farms.

Another problem of the invention consists in the provision of a transportable apparatus to prepare folder mixtures of the type mentioned for ensiling, which may be mounted in a position ready for transport on a road vehicle without any difficulties worth mentioning and with little space requirement, and may be transported and erected in the place where it is to be employed in a position for operation and ready for use, in which at least parts of the road vehicle serve as a platform for components of the system.

Another object of the present invention resides in the provision of a portable apparatus to prepare a fodder mixture of a pulpy consistency suitable for ensiling and capable of being pumped with a high concentration of nourishing substances having a predetermined advantageous albumen to starch ratio.

Another object of the invention resides in the provision of a portable apparatus for the preparation of a fodder mixture of pulpy consistency suitable for ensiling and capable of being pumped which fodder mixture after silage may be used as a sole fodder (formula).

It is another object of the present invention to provide a portable device suited to prepare a fodder mixture adapted to be pumped and suitable for ensilage, said fodder mixture being made up of fresh agricultural products rich in juice and relatively dry water-absorbing feedstuffs.

Another object of the invention resides in the provision of a mobile apparatus for the preparation of a fodder mixture adapted to be pumped and suited to be ensiled, which apparatus may be adapted to the various compositions of the fodder that may be desired without much further ado.

Figure 3C:
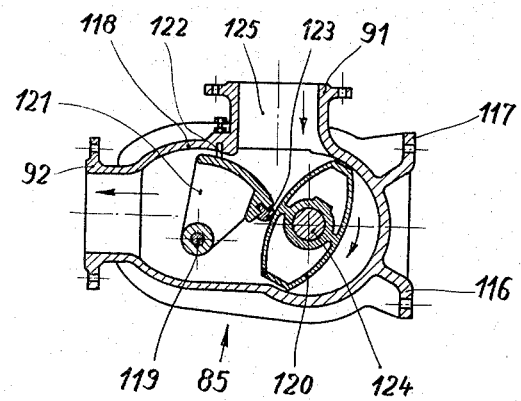
Figure 4A:
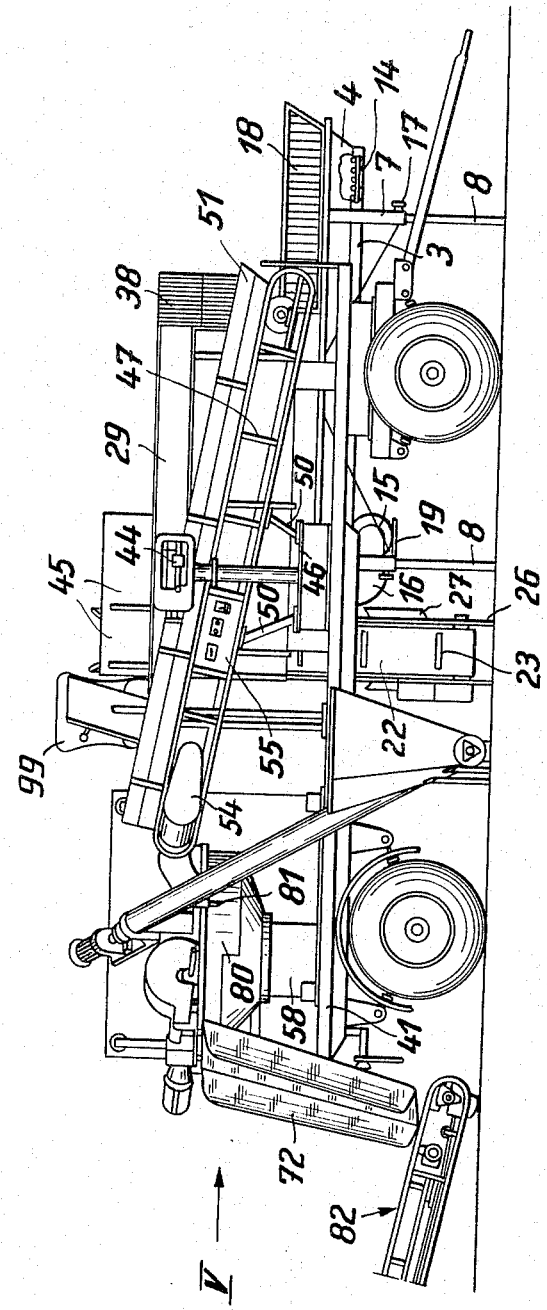

Further objects and advantages of the invention will be seen from the following description of a preferred embodiment thereof and the pertaining drawings. In the drawings, FIG. 1 is a schematic perspective view of a part of an ensiling apparatus in accordance with the invention in a position ready for transport, FIG. 2 shows a similar schematic and perspective view of the remaining part of the ensiling apparatus in accordance with the invention in a position ready for transport, the first part of which is shown in FIG. 1, FIGS. 3a and 3b together form a schematic perspective view of the ensiling device in accordance with the invention in its working position with the connecting line for current supply and the connecting line to the silo to be filled omitted, FIG. 3c shows a sectional view of a detail of FIG. 3b, FIG. 4a shows a schematic lateral view of the ensiling apparatus in accordance with the invention shown in FIG. 3a when looking in the direction of the arrow IVa of FIG. 3a, however, with the side walls of vehicle hinged downwardly and the parts shown in the left-hand half of FIG. 3b omitted, FIG. 4b shows a side view of the parts of the ensiling apparatus shown to the extreme left in FIG. 3b matching FIG. 4a with some parts broken away, FIG. 5 shows an end view of the ensiling devise shown in FIG. 4a looking in the direction of the arrow V of FIG. 4a with that part of the conveyor shown to the extreme left at the bottom of FIG. 4a omitted, FIG. 6a shows a top plan view taken on the ensiling apparatus shown in FIGS. 3, 4a, 4b and 5, FIG 6b shows a medium portion of FIG. 6a on an enlarged scale with certain parts broken away, FIG. 6c shows the left-hand portion of FIG. 6a on an enlarged scale, FIG. 6d shows the top portion of FIG. 6a on an enlarged scale, FIG. 6e shows the lower portion of FIG. 6a on an enlarged scale, FIG. 7 shows a sectional view taken on line VII—VII of FIG. 6b.

It is intended at first to describe the preferred embodiment of the ensiling apparatus in accordance with the invention shown in the drawings when arranged in the working position, as illustrated in FIGS. 3a–7.

As will be seen most readily from FIG. 6a to 6e there are several devices attached in a working position to the components of the ensiling device erected on a vehicle 42.

FIG. 6a shows a precleaner 1 in the top right-hand corner thereof into which fresh fodder, for instance beets or beet leaves are charged through its inlet end shown to the right. The outlet end shown to the left has connected thereto the inlet end of a first conveyor 21 which transports the fresh fodder which has been precleaned in the precleaner 1, to a washing machine 28. The fresh fodter passes through the washing machine and at the exit end of the washing machine disposed to the right in FIG 6a is discharged toward the entry end of a second conveyor 43 shown to the right in FIG. 6a, via a chute 38. This conveyor is supported on a weighing machine 44 and enables a weighing of the material placed on said conveyor. The exit end of the second conveyor 43 shown to the left in FIG. 6a feeds a combined mixing and comminuting device 56. Additional components of the mixture may be charged into the combined mixing and comminuting device 56 by means of a third conveyor 75 which is provided with a filling means 79 at its entry end shown at the bottom in FIG. 6a. Additional forage components may also be charged onto the second conveyor 42.

The pulpy feed material prepared in the combined mixing and comminuting device 56 from the various fodder components which is capable of being pumped, may be passed onto the entry end of a fourth conveyor 82 via a discharge chute 72. This fourth conveyor 82 shown to the left in FIG. 6a transports the feed pulp to the entry opening of a packing screw 83 pressing the feed pulp into the suction conduit of a silo filling pump 85. The discharge conduit 92 of the silo filling pump 85 may have a silo filling conduit, not shown, connected thereto directing the feed pulp discharged from the silo filling pump into a filling opening of a silo (not shown).

In the following, the components of the preferred embodiment of the invention as shown in the drawings will be described in more detail. The precleaner preferably comprises a shaking sieve consisting of a channel 2 having side walls 4 diverging obliquely upwardly and a bottom 3 in the form of a movably supported lattice-like grid.

The side walls 4 of the channel 2 are fastened to or suspended from a stand by means of lateral extensions 5, the legs 6 of said stand consisting of several (in this case two) leg portions 7 and 8 pushed onto into the other like a telescope. The mutual fixation of the leg portions 7 and 8 may be effected, for instance, through fixing screws 17. The bottom 3 of the precleaner 1 has one end supported for limiting lateral movement on elastic intermediate members, for instance metal-rubber buffers 14 on the side walls 4, said end in this case being the one shown to the right in FIGS. 4a and 6a.

At the opposite end of the precleaner 1, in this case at the exit end shown to the left in FIGS. 4a and 6a, the lower ends of the side walls 4 are provided with bearings 9 for a crank shaft 10, said shaft 10 comprising two coaxially aligned end portions each rotatably supported in one of the bearings 9, and a center portion 11 radially offset with respect to these end portions. The bottom 3 of the precleaner 1 is fastened to additional bearings 12 seated on the center portion of the crank shaft 10. There are pulleys 13 fitted to the ends of the shaft 10 to be safe against rotation. One of the pulleys 13 serves as a sheave for the drive for the precleaner 1 from a first electromotor 15 via a belt covered by a shroud 16. The electromotor 15 is adjustably supported on a motor switch armature 19 at the underside of the precleaner 1; said motor switch armature 19 being secured on the leg portions 7 rigidly connected with the side walls 4, for instance welded thereto. A chain drive or a gearing motor directly coupled with the shaft 10 may also be used instead of the belt drive. The drive of the precleaner 1 in each case is designed in such a manner that the bottom 3 of the sieve performs an up and down as well as forwardly and backwardly directed shaking movement serving once to clean the material charged into the chute from dirt loosely sticking thereto, and effecting also a transportation of the material lying at the bottom 3 of the second conveyor 21 because of the forwardly and backwardly directed movement of the precleaner 1. The shaking movement may take place for instance at a frequency of 100 vibrations per minute. In order to improve this conveying effect, the precleaner 1 may be arranged at a slight inclination with the aid of the leg portions 7 and 8 telescopically pushed one into the other and the locking screws 17. To facilitate the charging of feed material into the precleaner 1, a conically enlarging extension 18 in the form of a lattice is fastened to the upper edge of the side walls 4, which, for instance, may be screwed thereto or loosely plugged on.

As will be seen distinctly from FIGS. 5 and 6a, the precleaner may be erected at some distance from the carrier vehicle 20. This is advantageous in most cases because the precleaner and the parts of the device arranged on the vehicle 20 are disposed at different levels vertically and a level conveying device will be required between the precleaner 1 and these parts. In the preferred embodiment shown, this level conveying device consists of a second conveyor in the form of a belt conveyor 21 with a rotating endless conveyor belt 22 of rubber or any other suitable flexible material provided with rubber portion 23 at spaces of about 1 m. intended to avoid a slipping-off of the feed material present on the belt. Lateral guide rollers 24 are provided at the frame-work 25 of the belt conveyor 21 to guide the belt 22. The lower end of the belt conveyor 21 is provided with a support 26 (FIG. 5) and is seated on the bottom by said support. The belt drive is accommodated in the lower end of the belt conveyor 21. This belt drive consists of a second electromotor, preferably a conventional gearing motor driving a belt drive roller via a chain drive. In FIG. 5, only some switching elements for the belt drive are indicated at 52. The remaining parts of the belt drive are covered by a shroud 53.

Upright guiding walls 27 are fitted beside the two longitudinal edges of the upper run of the conveyor belt 22 on the upper side of the framework 25, said guide walls preventing the feed material from falling down. The lower end of the belt conveyor is arranged below the exit end of the precleaner 1 so that the material transported on the shaking sieve of the precleaner toward the exit end (left-hand end of the precleaner 1 in FIGS. 4a and 6a) drops onto the lower end of the upper run of the conveyor belt 22. The upper end of the framework 25 of the belt conveyor is fastened to a washing machine 28 in a suitable manner for instance with the aid of hooks, clamps, screw bolts or the like (not shown) in such a manner that the feed material dropping from the conveyor belt 22 at the upper end drops into the inlet end (in FIGS. 6a and 6b of the left-hand end) of the washing machine 28. The washing machine 28 in the preferred embodiment shown here consists of an elongated rectangular top open container 29 filled with water. The container 29 may be filled with water in any suitable way, for instance, by means of a hose connected to a locally available tapping place (not shown).

A sieve insert 30 having an approximately semi-circular cross sectional area is suspended within said container, the deepest point of which being disposed about intermediate the height of the container 29. The inlet end of the washing machine 28 is extended upwardly by essentially vertically extending impingement walls 45 so that the fodder components supplied from the conveyor belt 22 are safely intercepted and arrive in the washing machine 28. In the end walls 31 and 32 of the container 29 bearings 33 and 34, respectively, are arranged with a washing machine shaft 35 rotatably supported therein. On the shaft 35 there are vanes 36 arranged at mutual spaces from each other, said vanes extending essentially radially but being slightly distorted so that with the shaft 35 rotating the vanes 36 both circulate and clean the fodder material disposed in the sieve insert in the water and transport it to the exit end (the right-hand end in FIGS. 6a and 6b) of the washing machine 28. The radial length of the vanes 36 is dimensioned to be such that the vanes may rotate in the washing machine slightly spaced from the sieve insert 30. Two or several ejector vanes 37 are fastened at the exit end of the washing machine on the washing machine shaft 35. These ejector vanes are dimensioned such that they receive the washed fodder components arriving at the outlet end of the washing machine and eject them onto a chute 38 which is detachably fastened at the outlet end wall 32 of the washing machine, for instance hooked thereto.

The washing machine shaft 35 is rotated by means of a third electromotor 39 with a gearing 40 flanged thereto. The third motor 39, for instance, has an output of 3 PS and in connection with the gearing 40 produces a speed for the shaft 35 of about 40 r.p.m. The entire washing machine 20 together with the third electromotor 39 and the gearing 40 is rigidly mounted on the platform 41 of the carrier vehicle 42.

The chute 38 (FIG. 3a) consists of round bars made of steel, aluminum or other suitable material which are arranged at mutual spaces of about 50 mm. from each other and are connected to form a cage structure. In this chute the water still adhering to the fodder components may drip off. The chute 38 is arranged at a slope (FIG. 3a) with the entry end of a weighing conveyor arranged at the lower end thereof. Said weighing conveyor 43 in the preferred embodiment shown here consists of a sliding weight balance 44 mounted on the platform 41 of the vehicle 42 and a second conveyor 43. The balance 44 is provided with a weighing bridge 46 for the reception of the material to be weighed. On the weighing bridge 46 there is supported the carrier bracket 47 of the second conveyor 43 with the aid of two pairs of arms 50. This second conveyor 43 is designed in a manner similar to that of the first conveyor 21 and is comprised also of a conveyor belt 48 with rubber portions 49. The second conveyor 43 is likewise provided with elongated side walls 51 slightly inclined upwardly and outwardly. The drive of the second conveyor 43 is effected with the and of a fourth electromotor forming as in the case of the first conveyor 21 an individual drive and preferably designed as a gearing motor driving a belt drive pulley via a chain drive. The details of this belt drive are not shown in the drawings. FIG. 4a only shows a shroud 54 for these parts and a pertaining switchboard 55.

The elevated end at the exit end of the second conveyor 43 is disposed above the entry place of a combined mixing and comminuting means 56. In the preferred embodiment shown here a combined mixing and comminuting means is employed; however, it is also possible to use separate devices for mixing and comminuting. The combined mixing and comminuting means 56 contains a dish 57 adapted to be driven and rotatable about a vertical axis of rotation, said dish being supported for rotation on the undercarriage 58 mounted on the platform 31 of the vehicle 42. The dish 57 contains a core 70 and an annular space 71 of about semi-circular cross sectional shape. The undercarriage 58 carries furthermore a drive housing 59 with the dish partially entering therein. In the drive housing 59 there is arranged a fifth electromotor (not shown) driving the dish and a horizontal cutter shaft 60 rotatably supported in the drive housing via suitable power transmission means (not shown). The left-hand end of the cutter shaft 60 as shown in FIG. 6b carries cutters 61 which are also separately shown in the upper left corner of FIG. 6b. The cutters are covered by a detachable lid 62 which may be loosened from the drive housing 59 with the aid of a hand lever 63.

The output of the drive motor for the combined mixing and comminuting device 56 may be up to 90 H.P.; the speed of the cutter shaft 60 may range at approximately 1500 r.p.m.

To discharge the comminuted fodder material situated in the dish 57 a take-out device 64 is arranged at the undercarriage 58 of the dish 57. This take-out device essentially consists of a lifting arm 65 supported for pivotal movement in a vertical plane about a bearing point arranged in a bearing box 66. This vertical plane extends through the center of the annular dish volume as is distinctly visible from FIG. 6b. A take-out shaft (not shown) is supported for rotatable movement coaxially within the take-out arm 65. This take-out shaft is coupled to a sixth electromotor 67 by its end disposed outside the dish, said electromotor 67 being fastened to the take-out arm 65. The other end of the take-out shaft 69 which is disposed within the annular volume of the dish carries a disc 68 rotating with the take-out shaft 69. The pivotal movement of the take-out arm 65 about the bearing point thereof is effected by hydraulic or pneumatic servo cylinders accommodated within the bearing box 66. As the details of such a hydraulic or pneumatic lifting device are not intended to be covered by the present invention they are not shown nor described in any more detail. The lifting device for the take-out arm 65 is designed in such a manner that the disc 68 seated at the take-out shaft 69 may be lowered into the dish 57 so much that the disc 68 almost completely fills the annular space of the dish. The diameter of the semi-circular cross sectional shape of the dish space 71 is almost equal to the diameter of the disc 68.

In operation, the fodder material comminuted by the cutters 61 is moved on-ward in the dish space 71 in a direction to the take-out device 64. If the fodder material is to be taken out of the dish, the disc 68 in the dish is lowered. The fodder material accumulated at the disc 68 and, owing to the rotation of the said disc by means of the motor 67 is taken along in an upward direction and thrown outwardly into a discharge chute 72 by centrifugal force. In order to obtain an irreprochable guidance of the ejected fodder material a baffle 74 is arranged at the end of the dish 57. The disc 68 is covered by a detachable covering bonnet 73.

The combined mixing and comminuting means 56 in addition to being charged by the second conveyor 43 is still charged by a third conveyor 75. This third conveyor in the case of the preferred embodiment shown here consists of a screw type conveyor which comprises a conveyor tube 76 and a conveyor screw 78 rotatably supported therein and driven by a seventh motor 77. The conveyor tube 76 extends obliquely upwardly as far as above the dish 57, from a filling device 79 in this embodiment having the shape of a funnel arranged outside the vehicle 42. The upper portion of the conveyor tube 76 communicates with the vehicle 42. In the embodiment shown, the dish 57 is surrounded by a dish jacket 80 stationarily fixed at the undercarriage of the dish, and the conveyor tube 76 is suspended from the edge of the dish jacket 80 with the aid of hooks 81 fastened, for instance, welded to the conveyor tube. The lower end of the conveyor tube 76 still is provided with foot portions 76a in addition to the filling device 79 already mentioned (FIG. 5).

Another fodder component, for instance coarse-ground corn may be filled into the filling device 79. Said fodder component is likewise conveyed into the combined mixing and comminuting means 56 by means of the conveyor screw 75 and is mixed therein with those fodder components supplied from the conveyor 43.

Generally, the finished forage mixture discharged from the chute 72 must be transported to the silo into which it is to be filled through a considerable distance. Although the forage mixture thus produced is in itself pumpable, relatively high energy losses would result in the pumping operation because of the pulpy consistency of the material. Therefore, the system comprises fourth conveying devices conveying the material discharged from the chute 72 to a place closely adjacent the silo filling point with little loss. These fourth conveying device in the simplest type of embodiment consist likewise of belt conveyors 82 built up in a manner analogous to the belt conveyors 21 and 43 already described. With the preferred embodiment shown, the charging end of such a fourth conveyor 82 is arranged below the chute 72 and the discharging end above the filling opening of a packing screw 83. The level in which the discharge end is disposed may be adjusted as desired by means of supports 84 the length of which may be varied. The fourth conveyor 82 is also provided with an individual drive by an eighth electromotor (not shown), same as are the three other conveyors 21, 43 and 75.

The packing screw 83 serves the purpose of improving the sucking capacity of a silo filling pump 85 which with the pulpy consistency of the fodder mixture produced is not sufficient. The packing screw 83 consists of a conical top open vertical funnel 86 with a conveyor screw 87 conically tapering downwardly rotatably supported therein on a vertical shaft 88. The shaft 88 is directly coupled with a gearing motor 89. The lower end of the funnel 86 is formed as a flange 90 and fastened on the entry flange 91 of the silo filling pump 85. The exit end 92 of the silo filling pump 85 may be connected with the filling opening (in a manner not shown) of a silo (not shown). The silo filling pump 85 is driven by a gearing motor 93 via a coupling 94. The silo filling pump is mounted on a portable frame structure 95. FIG. 3c shows in a vertical sectional view some details of the silo fill pump 85 used in the preferred embodiment of the invention. The pump 85 is of the conventional rotary piston type and comprises a cast housing 118 having an inlet flange 91, an outlet flange 92 and two mounting flanges 116 and 117 for affixing the pump to the frame 95. The inlet flange 91 is connected to the flange 90 of the funnel 86 (FIG. 3b). The right part of the housing as viewed in FIG. 3c forms a cylinder section, and a rotary piston 120 is mounted for rotation within said cylinder section. The piston 120 is affixed to a piston shaft 124 mounted in suitable bearings. The rotary piston 120 is of elongated cross sectional shape so that its radially outer ends may pass with little clearance along the inner wall of the cylinder section of the housing 118. To form an inlet chamber together with the piston 120, a border blade 121 is pivotally mounted on a border blade shaft 119 which is arranged in parallel spaced relationship to the piston shaft 124 in the left part of the housing 118 as viewed in FIG. 3c. A first sealing strip 122 is arranged in the upper left part of the casing adjacent the inlet conduit 125 and forms a seal between the casing and the border blade 121. A second sealing strip 123 is arranged in the part of the border blade facing the rotary piston 120 and acts as a seal between border blade and piston. In operation, the rotary piston 120 is rotated by the motor 93 in the direction of the arrow indicated in FIG. 3c. The second sealing strip 123 always keeps contact with the outer surface of piston 120. As may readily be seen from FIG. 3c, the rotating piston conveys any pulpy fodder material introduced through inlet conduit 125 to the pump outlet 92. Of course, other types of pumps may be employed, e.g. screw type pumps.

The electric supply lines for the various driving motors of the system are connected to a supervisory switch control station 96 which is likewise mounted on the vehicle 42. In the simplest embodiment, this switch control may consist of a distributor circuit with the supply lines for the individual machines emanating from a main terminal which may be connected to a voltage source, for instance the power current net via a main cable (not shown), with the interposition of fuses, switches, counter and other devices usual in such installations. In this simplest case, the motor of the individual machines are manually switched on and off as required during the run-off of one working cycle. With the preferred embodiment shown, remote controlled switches are employed which are accommodated in weatherproof capsuled switch boxes 97. The control of the remotely operated switches is effected via electric control lines (not shown) from a control desk 98 arranged on the vehicle 42 at a point from where all the operational steps may be well supervised. In front of the control desk 98, a seat 99 is provided for the operator. As will be seen especially from FIGS. 3 and 6 the operator may also read the adjustment of the sliding weight balance 44 while occupying his seat 99. The control desk 98 contains switches 100 and push buttons 101 for the remote operation of the switching devices accommodated in the switching boxes 97 as well as signal lamps and other eventually desired control, switching and supervising means. The power requirement of the entire system is relatively great and with the preferred embodiment the maximum is at 150 kva. In many cases, there is no connection to the mains of so high a connected load available at the place of erection, for instance on a farm. Therefore, with the preferred embodiment, a second vehicle 102 is provided on which a current generator with a driving output of say 180 H.P. and a maximum power discharge of about 150 kva. is taken along which is coupled with an internal combustion engine. The second vehicle in addition serves to transport certain parts of the system and other accessories as will be described in more detail in the following. A flexible electric cable (not shown) leads from the current generator of the aggregate of the main terminal of the supervisory switching control station 96. In the preferred embodiment, the current generator is a 3-phase generator and a diesel engine serves as the internal combustion engine to drive the 3-phase generator. FIGS. 3a and 3b show a perspective view of the system erected ready for operation. In the following, the system will be described in its position for transport in which it is accommodated on the vehicles 42, 102.

FIG. 1 shows the carrier vehicle 42 which has already been mentioned. As will be distinctly seen from FIG. 1, the washing machine 28, the chute 38, the second conveyor 43 together with the sliding weight balance 44, the combined mixing and comminuting means 56, the supervisory switch control station 96, the seat 99 for the operator, and the switching desk 98 are arranged in the same position on the vehicle 42 as in operation. It will also be seen that the third conveyor 75 with its driving motor 77 and the filling device 79 is placed into the second conveyor 43 for transport and is fastened there somehow for instance with the aid of screwings or clamping bands (not shown).

The remaining parts of the system and additional material which will be required in dependence upon the special relationships are arranged on a second vehicle 102 a perspective view of which is shown in FIG. 2. The major part of this loading space available on this vehicle is occupied by the diesel 3-phase aggregate 103. As the build-up and mode of operation of such a current generating aggregate are well known to any expert it is refrained from giving any more detailed description of the current generator here. With the various components of the system disposed in their positions of transport as shown in FIG. 2, the diesel 3-phase aggregate is mostly covered by other parts. Fitted around the diesel 3-phase aggregate is a frame structure 104 provided with holding device 105. FIG. 2 only shows some of the holding devices; it is, however, obvious that any number of additional and/or other types of holding devices may be fitted to the frame structure and/or the vehicle body 102 in accordance with the respective requirements.

The conveyors 21 and 22 are detachably fastened at the longitudinal sides of the vehicle 102 on either side of the 3-phase aggregate 103, for instance, suspended from the holding devices 105 formed as hooks. As already mentioned above, it must be possible to adapt the length of the conveyors 82 to the relationships prevailing at the respective site. Therefore, three identical conveyors indicated by reference numeral 82 are carried along on the vehicle 102 which may be used either singly or arranged in a series one after the other. The frame structure 95 with the silo filling pump 85 supported therein, the coupling 94 and the motor 93 are accommodated at one end face of the vehicle 102. The frame structure 95 is secured against sliding movement during transport for instance by being screwed to the platform of the vehicle 102. The packing screw 83 is detachably fastened between the frame structure 95 of the silo filling pump and the diesel 3-phase aggregate 103 at the frame structure 104 of the diesel 3-phase aggregate 103, for instance, clamped with the aid of screw clamps. Tubes 106 and 107 are detachably fastened at the upper portion of the frame structure 104, for instance clamped by means of pipe clips 108. These pipes 106 and 107 may for instance serve the purpose of pumping the feed pulp pumped by the silo filling pump 85, into an elevated filling opening of a silo (not shown) with the interposition of flexible conduit portions should this be necessary with the silos available at site. The precleaner 1 is fastened for transport at the top of the frame structure 104 for the diesel 3-phase aggregate 103, for instance, by screws and clamps. The vehicles 42 and 102, in the preferred embodiment shown, consist of trailers for trucks. These trailers are provided with a platform 41 or 109, respectively, and hinged sideboards 110–113. In the position for transport, these sideboards are in their upwardfolded position. In the working position, at least some of the sideboards are hinged downward (FIG. 3a) in order to be able to erect the system in the working position with no obstructions. Besides, the vehicles 42 and 102 are designed in the conventional manner each expert is fully conversant with so that no further description will be necessary.

For transport, the vehicles 42 and 102 which are coupled to each other are attached to a truck 114. In the preferred embodiment shown the truck is provided with a loading crane 115 which on site serves to lift parts of the system from the vehicles 42 and 102 and when the work has been done lifts them again onto the vehicles.

An ensiling apparatus accommodated on a trailer 42 for a truck in the manner as described is capable of working up about 14 to 15 tons of fresh fodder per hour.

In the following, a description of the mode of operation of the described embodiment of the invention will be given by way of example.

If, for instance, it is intended to fill on a farm a silo of a capacity of 100 m.$^3$ with the fodder mixture as described above, the ensiling apparatus, as described will have to work for about one day, including erection. The amount of fodder contained in a silo of 100 m.$^3$ suffices to feed about 200 pigs with a fattening period of 5 months. It will be seen from these figures that it does not pay for medium sized farms to buy themselves all the machines necessary for the preparation of the silage mixture. Therefore, in the case which has been described, the employment of the mobile system in accordance with the invention will be to the purpose.

The truck and trailer combination consisting of the truck 114, the first trailer 42 and the second trailer 102 drives to the working place. Here, the parts of the system are erected in their position of work which is shown in FIGS. 3a–7. The output terminal 92 of the silo filling pump 85 is connected to the filling opening of the silo. The supervisory switch control station 96 is connected with the output of the current generator via a cable provided for this purpose. The washing machine 28 is filled with water. Thereupon, the internal combustion engine driving the current generator is started. The operator takes his seat at the control desk 98. Fresh fodder is charged into the entry end of the precleaner 1 (right-hand side in FIGS. 4a and 6a), for instance grass, fresh beets, beet leaves, fresh potatoes, lucernes or similar farm products. The operator starts the first electromotor via the switch desk 98 so that the bottom 3 of the precleaner or shaking sieve is subjeced to the shaking movement as described by the first electromotor 15. Thereby, the material present in the precleaner 1 is cleaned from dirt loosely adherent thereto and transported to the entry end of the first conveyor 21. The operator starts the driving motor of the first conveyor (i.e. the second electromotor) at the latest when a certain amount of fresh fodder has accumulated at the entry end of the first conveyor 21. The first conveyor 21 transports the precleaned fresh fodder into the washing machine 28. The operator will start the motor 39 for the washing machine via the control desk 98 at the latest after the entry of the first amounts of fresh fodder into the washing machine. Thereafter the fresh fodder entering the washing machine is circulated in the water present in the washing machine under the influence of the rotating vanes 36 and conveyed to the exit end of the washing machine. Here the washed fresh fodder is seized by the ejector vanes 37 and ejected into the chute 38. Excess water drips from the fresh fodder while in the chute and the fresh fodder slides in a direction toward the entry end of the second conveyor 43. At this moment at the latest the operator starts the driving motor for the second conveyor 43 (i.e. the fourth electromotor) via the control desk 98. Now, the operator has the belt of the second conveyor intermittently run until such time as the scale 44 shows a predetermined weight of the material present on the conveyor belt 48. The operator is in a position to control the supply of fresh fodder to the second conveyor 43 as desired by switching on and off the driving motor 39 of the washing machine. The arrangement preferably is such that the conveying capacity and the holding capacity of the washing machine 28 and the second conveyor are relatively high so that even with a discontinuous operation of these two machines no undesired fresh fodder accumulations can occur. The capacity of the upper run of the second conveyor may for instance be approximately 200 kg.; however, larger capacities are easily obtainable. As soon as the operator when taking the reading from the weighing machine 44 sees that the prescribed amount of fodder has been placed on the conveyor belt 48 he allows the conveyor belt 48 to move onward until the weighed amount of fodder present on said conveyor belt 48 has completely been charged into the combined mixing and comminuting means 56. At this moment at the latest the operator switches on the driving motor of the combined mixing and comminuting machine (i.e. the fifth electromotor) by way of the control desk 98 so that the amount of fodder charged thereinto is agitated and comminuted by the knives 61 into a fine pulp. It is possible to charge another fodder component into the combined mixing and comminuting means via the third conveyor 75 independently of the feeding of fresh fodder. Generally, corn or coarse ground corn is charged into the filling device 79 of the third conveyor 75. The conveying performance of the conveyor screw 78 of the third conveyor is known from experience so that the operator if he intends to fill a certain amount of corn into the combined mixing and comminuting means 56 only need operate the third conveyor 75 for a certain amount of time. For this purpose, a watch or adjustable time switch may be provided at the control desk 98 for the driving motor of the third conveyor 75 (i.e. for the seventh motor). Additional fodder components are filled into the combined mixing and comminuting means 59 either directly by metered amounts for instance from sacks or are weighed into the combined mixing and comminuting means 59 with the aid of the second conveyor 42 and the weighing machine 44 while the washing machine motor 39 is at a standstill. In the combined mixing and comminuting means 59, the various fodder components are intensively mixed and comminuted so that with the composition mentioned at the beginning being stuck to, a pumpable pulp is forming in the combined mixing and comminuting device 59. The basic idea of this is to bind the juice contained in the fresh fodder by other relatively dry fodder components so that the entire juice content is maintained; a high concentration of nourishing substances is obtained, and a desired composition of the fodder mixture, especially a predetermined albumen to carboyhydrate relationship is achieved. As soon as the pump produced in the combined mixing and comminuting means 56 is sufficiently fine which condition may be well detected by the operator from its seat and may also be established empirically on the basis of the period of time for which the combined mixing and comminuting device 56 has been running, the operator will switch on the hydraulic or pneumatic lifting device of the take-out arm 65 in such a manner that the lifting arm lowers and the lifting disc dips into the pulp circulated in the dish 57. In this operation, the operator in addition switches on the driving motor of the take-out disc 68 (i.e. the sixth electromotor 67) so that by rotation of the disc 68 dipped into the pulp, the pulp accumulated at the disc 68 is thrown upwardly and ejected into the chute 72. It is at the latest at this moment that the operator swiches on the driving motor of the fourth conveyor 82 by way of the control desk 98 so that the feed pulp guided onto the entry end of the fourth conveyor 82 from the chute 72 is transported into the inlet of the packing screw 83. The operator then at the latest when the funnel shaped jacket 86 of the packing screw is almost completely filled with the feed pulp switches on the driving motor 89 of the packing screw and the driving motor 93 of the silo filling pump 85 by way of the control desk 98 so that the feed pulp transported into the packing screw is pumped into the silo.

It is apparent that some, or all of the driving motors may also be switched on simultaneously when starting the system. In particular, the driving motors of the combined mixing and comminuting means 56 and the fourth conveyor may run continuously.

Both the combined mixing and comminuting means 56 and the packing screw have considerable capacities so that the system may also be operated intermittently or on a charge by charge basis.

There are many alterations of modifications possible with the preferred embodiment and mode of operation shown and described without leaving the scope of the invention. For instance, the components of the system in accordance with the invention may be distributed on one or several vehicles in a different manner; different equipment may be used for weighing, cleaning, transporting, comminuting and mixing the fodder components used and other types of energy supply and machine drive may be employed.

What I claim is:

1. A system and apparatus for preparing a fodder mixture for subsequent storage in a silo comprising, in combination, fodder precleaning means for cleaning fresh fodder supplied thereto, said fodder precleaning means having power driven means for moving said fresh fodder, a washing machine for washing fresh fodder delivered from said fodder precleaning means, said washing machine having power driven means for moving said fresh fodder, first power driven conveyor means operatively arranged between said fresh fodder precleaning means and said washing machine to convey precleaned fresh fodder from said fodder precleaning means to said washing machine, power-driven comminuting and mixing means for comminuting and intimately mixing fodder material supplied thereto, second power-driven conveyor means operatively arranged between said washing machine and said comminuting and mixing means to convey washed fresh fodder from said washing machine to said comminuting and mixing means, weighing means supporting said second conveyor means to determine the amount of fodder material present on said second conveyor means, third power-driven conveyor means operatively connected to said comminuting and mixing means to supply thereto a relatively dry fodder material suited to establish in the fodder mixture prepared in said comminuting and mixing means an overall water content which is considerably smaller than in said fresh fodder alone so that said mixture attains a pulpy but still flowable consistence, selectively operable mixture takeout means operatively connected to said comminuting and mixing means to selectively take out said mixture prepared therein, silo-filling pumping means for pumping said mixture to said silo, fourth conveyor means operatively connected between said take-out means and said pumping means to transport said mixture taken out of said comminuting and mixing means to said pumping means for subsequent pumping said mixture to said silo, a road truck adapted to support and transport all components of said system and apparatus if said components are arranged in a transportation assembly upon said road truck, and to support partly or wholly a certain number of said components if said components are cooperatively arranged in a working arrangement, and means for selectively supplying energy to the various drive means of said components.

2. A system and apparatus for preparing a fodder mixture for subsequent storage in a silo comprising, in combination, fodder cleaning means for cleaning fresh fodder supplied thereto, power-driven comminuting and mixing means for comminuting and intimately mixing fodder material supplied thereto from said fodder cleaning means and other sources in predetermined amounts suited to form in said comminuting and mixing device a fodder mixture having a water content considerably smaller than said fresh fodder but still being of a pulpy and pumpable consistence, weighing means for weighing amounts of fodder material to be supplied to said comminuting and mixing means, selectively operable mixture take-out means operatively connected to said comminuting and mixing means to selectively take out said mixture prepared therein, pumping means for pumping said mixture taken out of said comminuting and mixing device to said silo, a road truck adapted to support and transport all components of said system and apparatus if said components are arranged in a transportation assembly upon said road truck, and to support partly or wholly a certain number of said components if said components are cooperatively arranged in a working arrangement, and means for selectively supplying energy to the various drive means of said components.

3. A system and apparatus for preparing a fodder mixture for subsequent storage in a silo comprising, in combination, fodder precleaning means for cleaning fresh fodder supplied thereto, said fodder precleaning means having power driven means for moving said fresh fodder, a washing machine for washing fresh fodder delivered from said fodder precleaning means, said washing machine having power driven means for moving said fresh fodder, first power driven conveyor means operatively arranged between said fresh fodder precleaning means and said washing machine to convey precleaned fresh fodder from said fodder precleaning means to said washing machine, power-driven comminuting and mixing means for comminuting and intimately mixing fodder material supplied thereto, second power-driven conveyor means operatively arranged between said washing machine and said comminuting and mixing means to convey washed fresh fodder from said washing machine to said comminuting and mixing means, weighing means supporting said second conveyor means to determine the amount of fodder material present on said second conveyor means, third power-driven conveyor means operatively connected to said comminuting and mixing means to supply thereto a relatively dry fodder material suited to establish in the fodder mixture prepared in said comminuting and mixing means an overall water content which is considerably smaller than in said fresh fodder alone so that said mixture attains a pulpy but still flowable consistence, selectively operable mixture takeout means operatively connected to said comminuting and mixing means to selectively take out said mixture prepared therein, silo-filling pumping means for pumping said mixture to said silo, fourth conveyor means operatively connected between said take-out means and said pumping means to transport said mixture taken out of said comminuting and mixing means to said pumping means for subsequent pumping said mixture to said silo, a road truck adapted to support and transport all components of said system and apparatus if said components are arranged in a transportation assembly upon said road truck, and to support partly or wholly a certain number of said components if said components are cooperatively arranged in a working arrangement, means for selectively supplying energy to the various drive means of said components, a control panel mounted upon said truck at a location where an operator is able to visually supervise the operation of said components of said system, said control panel being adapted to enable said operator to control the operation of all power drive means employed in said system.

4. A system and apparatus as in claim 3 wherein said power drive means are electrically operated and wherein for the distribution of electrical energy to said components a power distribution and switchboard having remotely controllable switching means is provided upon said truck and adapted to be connected to a source of electric power, said power distribution and switchboard being controllably connected to said control panel.

5. A system and apparatus as in claim 3, wherein for the generation of electrical energy to operate said components an electric generator and an internal combustion engine drivably coupled thereto are provided upon said truck, said control panel being connected to said generator so as to enable proper function of said panel.

6. A system and apparatus for preparing a fodder mixture for subsequent storage in a silo comprising, in combination, fodder cleaning means for cleaning fresh fodder supplied thereto, power-driven comminuting and mixing means for comminuting and intimately mixing fodder material supplied thereto from said fodder cleaning means and other sources in predetermined amounts suited to form in said comminuting and mixing device a fodder mixture having a water content considerably smaller than said fresh fodder but still being of a pulpy and pumpable consistence, weighing means for weighing amounts of fodder material to be supplied to said comminuting and mixing means, selectively operable mixture take-out means operatively connected to said comminuting and mixing means to selectively take out said mixture prepared therein, pumping means for pumping said mixture taken out of said comminuting and mixing device to said silo, a road truck adapted to support and transport all components of said system and apparatus if said components are arranged in a transportation assembly upon said road truck, and to support partly or wholly a certain number of said components if said components are cooperatively arranged in a working arrangement, and means for selectively supplying energy to the various drive means of said components, a control panel mounted upon said truck at a location where an operator is able to visually supervise the operation of said components of said system, said control panel being adapted to enable said operator to control the operation of all power drive means employed in said system.

7. A system and apparatus as in claim 6, wherein said power drive means are electrically operated and wherein for the distribution of electrical energy to said components a power distribution and switchboard having remotely controllable switching means is provided upon said truck and adapted to be connected to a source of electric power, said power distribution and switchboard being controllably connected to said control panel.

8. A system and apparatus as in claim 7, wherein for the generation of electrical energy to operate said components an electric generator and an internal combustion engine drivably coupled thereto are provided upon said truck, said control panel being connected to said generator so as to enable proper function of said panel.

References Cited by the Examiner

UNITED STATES PATENTS

| | | | |
|---|---|---|---|
| 2,193,954 | 3/1940 | Warner | 209—346 |
| 2,205,898 | 6/1940 | Chandler | 99—235 |
| 2,616,564 | 11/1952 | Schrock | 171—17 X |
| 2,770,242 | 12/1956 | Tubiolo | 134—48 |
| 2,775,174 | 12/1956 | Petrick | 171—18 |
| 2,896,923 | 7/1959 | Luscombe | 259—97 X |
| 2,953,360 | 9/1960 | Kline | 259—97 X |
| 2,970,532 | 2/1961 | Skelton | 99—235 |
| 3,075,456 | 2/1963 | Uschmann | 100—138 |
| 3,181,482 | 5/1965 | Heth et al. | 99—235 X |

WALTER A. SCHEEL, *Primary Examiner.*

R. W. JENKINS, *Assistant Examiner.*